May 13, 1947.   L. G. BACON   2,420,581
TRANSMISSION FOR STEAM OR INTERNAL COMBUSTION ENGINES
Filed Dec. 21, 1944
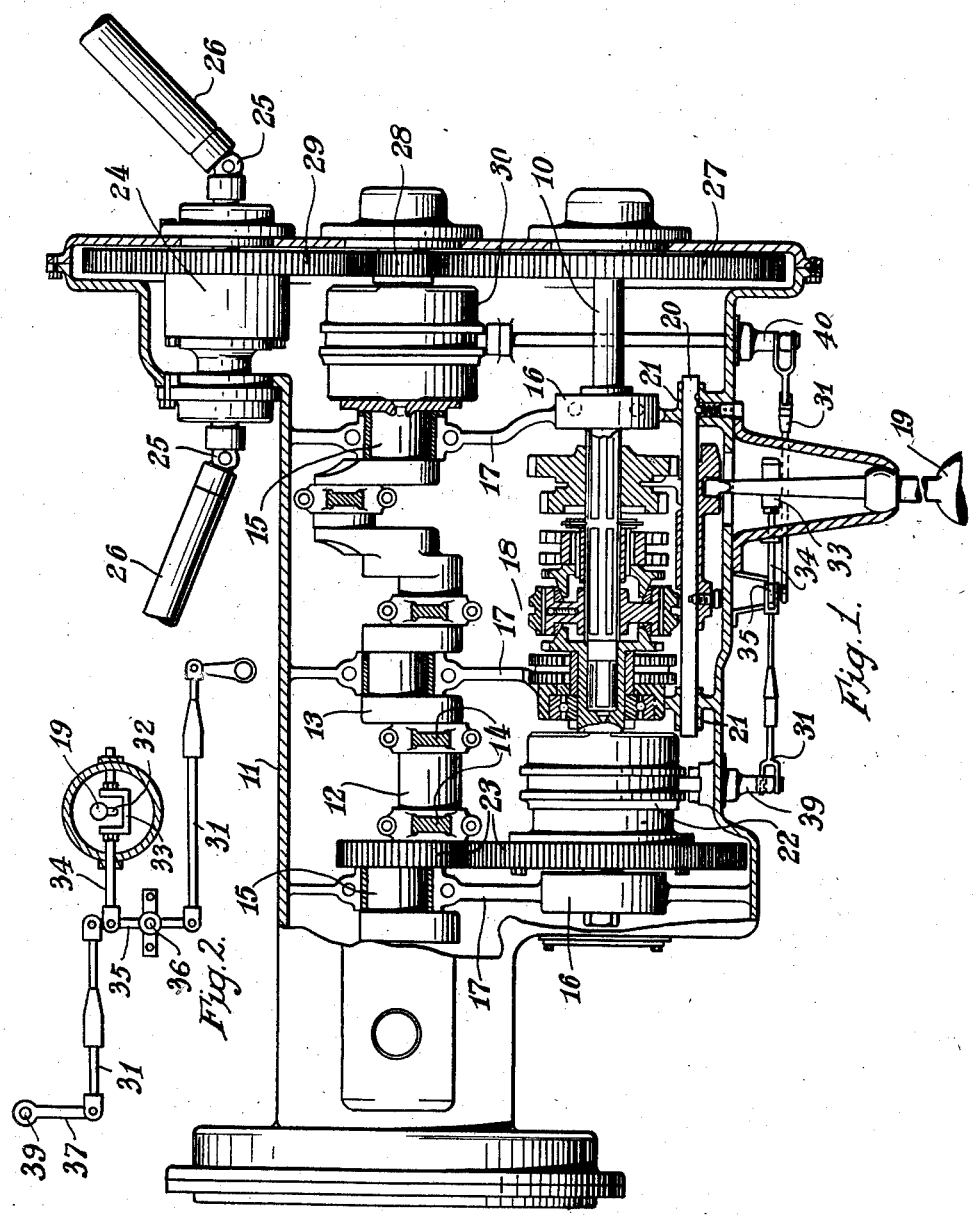
INVENTOR.
LAURENCE GUY BACON.
By: Francis T. Boyer
ATTORNEY.

Patented May 13, 1947

2,420,581

UNITED STATES PATENT OFFICE 2,420,581

TRANSMISSION FOR STEAM OR INTERNAL-COMBUSTION ENGINES

Laurence Guy Bacon, Torquay, England

Application December 21, 1944, Serial No. 569,179
In Great Britain November 30, 1943

2 Claims. (Cl. 192—3.5)

This invention relates to steam or internal combustion engines, the object being to provide improvements therein.

The invention is particularly applicable to multi-cylinder engines.

According to this invention a steam or an internal combustion engine is provided with an auxiliary shaft disposed adjacent and parallel to the crank-shaft, the crank-shaft and the auxiliary shaft are provided with co-engaging elements and the auxiliary shaft with gear-change elements whereby the drive may be conducted from the crank-shaft to the driven member through the said auxiliary shaft.

One form of the invention, as applied to a multi-cylinder internal combustion engine, is illustrated in the accompanying drawings, wherein Fig. 1 is a sectional plan of a portion of an engine embodying the present invention; and Fig. 2 is a detail elevation of the clutch-operating levers.

A two-part auxiliary shaft 10 is disposed within an engine casing 11, parallel to a multi-throw crank-shaft 12 and spaced from the crank-shaft a sufficient distance to allow the cranks 13 to rotate. 14, 14 are piston connecting rods, 15, 15 are the crank shaft bearings, and 16, 16 are the auxiliary shaft bearings, all the bearings being supported in the webs 17.

Gear-change elements are mounted on the auxiliary shaft 10, and are adapted to be actuated by the gear change lever 19 through a rod 20 axially slidable in bearings 21. The gear change elements may be of any suitable form, and are exemplified at 18; they may be associated with other gear elements mounted on a lay shaft disposed below the shaft 10 and not illustrated. A clutch device 22 is mounted on the shaft 10, and is connected to the crank-shaft 12 by intermeshing gear wheels 23. The rear road wheels of a road vehicle are driven through a differential 24, universal joints 25, and shafts 26, the said differential 24 being connected to the auxiliary shaft 10 by intermeshing gear wheels 27, 28, 29, the wheel 27 being rigidly mounted on the shaft 10, the wheel 28 freely mounted on or in alignment with the shaft 12, and the wheel 29 rigidly mounted on the differential 24. Thereby, a drive may be transmitted from the crank-shaft 12 to the road wheels through gear wheels 23, clutch 22, auxiliary shaft 10, gear change elements 18, gear wheels 27, 28, 29, differential 24, and shafts 26.

A second clutch device 30 may be mounted on the crank-shaft 12 and connected to the gear wheel 28, whereby a drive may be transmitted direct from the crank-shaft 12 to the road wheels through clutch 30, gear wheels 28, 29, differential 24, and shafts 26. The clutches 22 and 30 may be actuated by operating rods 31, which may be interconnected with the gear lever 19, whereby one or the other of said clutches may be operated to transmit a drive. Suitably, as shown in Figs. 1 and 2, a tongue 32 on the lever 19 is adapted to cooperate with a saddle 33 on a rod 34 so that when the lever 19 is operated the rod 34 is moved in one axial direction or the other. Movement of the rod 34 actuates, through a lever 35 mounted on a pivot 36 and the operating rods 31, levers 37 and 38 on rods 39 and 40 which operate the clutches 22 and 30 respectively.

It will be seen that a compact unit comprising engine and gear reduction device will be provided.

In a multi-cylinder engine the gear element or elements on the crank-shaft, which is or are part of the gear elements connecting the crank-shaft to the auxiliary shaft, is or are preferably disposed with one or more piston connecting rods at each side of them.

The invention may be applied to steam and multiple compound engines.

By the use of this invention the positioning of an engine at the rear of a motor road vehicle is made more practicable, and it may be disposed transversely of the vehicle, that is, with the crank-shaft disposed at right angles to longitudinal centre line of the vehicle.

What I claim and desire to secure by Letters Patent is:

1. In a reciprocating engine having a driving crank shaft and a driven member, an auxiliary shaft adjacent and parallel to the crank-shaft, gear elements on said crank-shaft and gear elements on said auxiliary shaft, said gear elements on the crank shaft being in operative engagement with the gear elements on the auxiliary shaft, gear-change elements on said auxiliary shaft, means for transmitting a drive from said crank shaft to the driven member, means for transmitting a drive from said auxiliary shaft to the driven member, a first clutch device on said crank shaft, a second clutch device on the auxiliary shaft, and means for operating said first and second clutch devices so that one of said clutch devices is in the clutching position while the other of said clutch devices is in the declutched position whereby a drive may be transmitted to the driven member direct from the crank shaft or through the gear-change elements and the auxiliary shaft.

2. A reciprocating engine according to claim 1, provided with multi-cylinders, the said co-engaging gear elements on the crank-shaft and the auxiliary shaft being disposed in a plane between two adjacent cylinders.

LAURENCE GUY BACON.

REFERENCES CITED

The following references are of record in the file of this patent:

UNITED STATES PATENTS

| Number | Name | Date |
|---|---|---|
| 1,125,140 | Lucke | Jan. 19, 1915 |
| 1,614,819 | Bauer | Jan. 18, 1927 |
| 1,783,513 | Maurer | Dec. 2, 1930 |
| 2,103,543 | McCormick et al. | Dec. 28, 1937 |
| 2,243,482 | Meyer | May 27, 1941 |
| 2,265,078 | Marsh | Dec. 2, 1941 |

FOREIGN PATENTS

| Number | Country | Date |
|---|---|---|
| 452,133 | France | Mar. 1, 1913 |